United States Patent [19]

Habiger et al.

[11] 3,952,515

[45] Apr. 27, 1976

[54] SPEED AND LOAD RESPONSIVE UNDERSPEED ACTUATOR FOR HYDROSTATIC TRANSMISSIONS

[75] Inventors: Cyril W. Habiger; William D. McMillan, both of Joliet; David L. Persson, Chillicothe, all of Ill.; Glenn E. Ferre, deceased, late of Peoria, Ill., by Marjorie E. Ferre, legal representative and executrix

[73] Assignee: Caterpillar Tractor Co., Peoria, Ill.

[22] Filed: Feb. 20, 1975

[21] Appl. No.: 551,465

[52] U.S. Cl. .................................. 60/447; 60/465; 60/488
[51] Int. Cl.² .......................................... F16H 39/46
[58] Field of Search ............ 60/427, 433, 443, 444, 60/447, 449, 465, 488

[56] References Cited
UNITED STATES PATENTS

| | | | |
|---|---|---|---|
| 3,054,263 | 9/1962 | Budzich et al. | 60/447 |
| 3,477,225 | 11/1969 | Cryder et al. | 60/433 |
| 3,526,288 | 9/1970 | Cryder et al. | 60/447 X |
| 3,528,243 | 9/1970 | Cryder et al. | 60/444 X |
| 3,891,354 | 6/1975 | Bosch | 60/449 X |

*Primary Examiner*—Edgar W. Geoghegan
*Attorney, Agent, or Firm*—Phillips, Moore, Weissenberger, Lempio & Strabala

[57] ABSTRACT

A hydrostatic unit of the type contemplated by the present invention includes one or more pump and motor combinations interconnected by means of a conventional closed loop. Controls for the hydrostatic unit include a speed control and vent valve assembly as well as a venturi manifold which functions to normally establish a selected pressure differential in a pair of supply conduits. In order to automatically regulate displacement of each pump unit in response to both engine or prime mover speed and instant load conditions, an underspeed actuator valve unit is hydraulically responsive to the differential pressure in the two conduits and also to changes in output pressure developed by the pump unit.

9 Claims, 8 Drawing Figures

MAXIMUM SPEED —
ZERO SPEED
VENT & BRAKE

Fig_4_

Fig_5_

SPEED AND LOAD RESPONSIVE UNDERSPEED ACTUATOR FOR HYDROSTATIC TRANSMISSIONS

BACKGROUND OF THE INVENTION

The present invention relates to an underspeed actuator unit which is responsive to operating speed of a prime mover or engine in order to automatically adjust a variable drive coupling in a transmission driven by the prime mover. More particularly, the transmission is of a hydrostatic type including one or more pump units with the underspeed actuator being operable to adjust displacement of the pump or pumps in response to both speed variations of the transmission input and changes in output pressure from the pump unit or units.

Hydrostatic transmissions adapted for track-type vehicles commonly include parallel pump units each having variable displacement in order to permit operator control over vehicle speed and direction by appropriately varying displacement of one or both pumps. The present invention is particularly described below in connection with a hydrostatic transmission of this type. However, it will be apparent from the following description that the present invention is also applicable to more conventional hydrostatic transmissions having a single pump unit or multiple pump units whose displacement is always simultaneously varied as well as other types of transmissions.

In most hydrostatic transmissions, it is desirable to reduce the load placed upon the prime mover by the transmission when operating speed of the prime mover falls below a selected range because of an external load, such as when a vehicle including the prime mover and transmission is operating uphill or otherwise encounters an increased load.

The use of underspeed regulator or actuator valves is known in connection with hydrostatic transmissions for overcoming this problem as may be seen by reference to U.S. Pat. No. 3,477,225 and U.S. Pat. No. 3,727,628, both of which are assigned to the Assignee of the present invention. Another underspeed actuator is disclosed in a copending application entitled: UNDERSPEED ACTUATOR FOR HYDROSTATIC TRANSMISSION, filed on Feb. 20, 1975, as Ser. No. 551,474, assigned to the assignee of the present invention.

The underspeed actuators disclosed by these references are responsive only to a change in engine speed and do not begin to adjust pump displacement until engine speed is substantially varied. Normally, pressure changes which the pump encounters in the hydrostatic loop with an associated motor and resultant torque changes are relatively gradual allowing time for the underspeed actuator to suitably adjust displacement of the pump. However, when a load is suddenly imposed on the hydrostatic motor causing an immediate increase in the pump output pressure, there is a short time lag before engine speed starts to decrease and the underspeed actuator starts to react. Although the lag in time may generally be only momentary, the underspeed actuator tends to over-correct, thus developing a condition of "hunting" until pump displacement, pump output pressure and engine speed again stabilize. This time lag also permits detrimental pressure extremes in the hydrostatic loop between the pump and motor.

SUMMARY OF THE INVENTION

Accordingly, it is an object of the present invention to provide a simple underspeed actuator unit for adjusting the variable capacity of a transmission in response to operating speed of a prime mover coupled with the transmission input and/or in response to changes in load imposed upon an output element of the transmission.

It is a more particular object of the invention to provide an underspeed actuator unit in conjunction with a hydrostatic transmission, the underspeed actuator unit being responsive to operating speed of a prime mover or input element for the transmission and/or to instant changes in output pressure of the pump unit.

It is yet another object of the invention to provide such an underspeed actuator unit which is responsive to a differential pressure produced by a proportional pump, a venturi manifold assembly and a speed control and vent valve assembly, the speed control and vent valve assembly being manually operable to override the underspeed actuator unit.

Additional objects and advantages of the invention are made apparent in the following description having reference to the accompanying drawings.

DESCRIPTION OF THE PREFERRED EMBODIMENTS

As indicated above, the present invention relates particularly to an underspeed actuator within a control system for a variable capacity transmission, the underspeed actuator being responsive to input speed and load conditions for the transmission. The invention is particularly directed toward a hydrostatic transmission and control circuit illustrated in composite by FIGS. 1 and 2.

Figure 1:
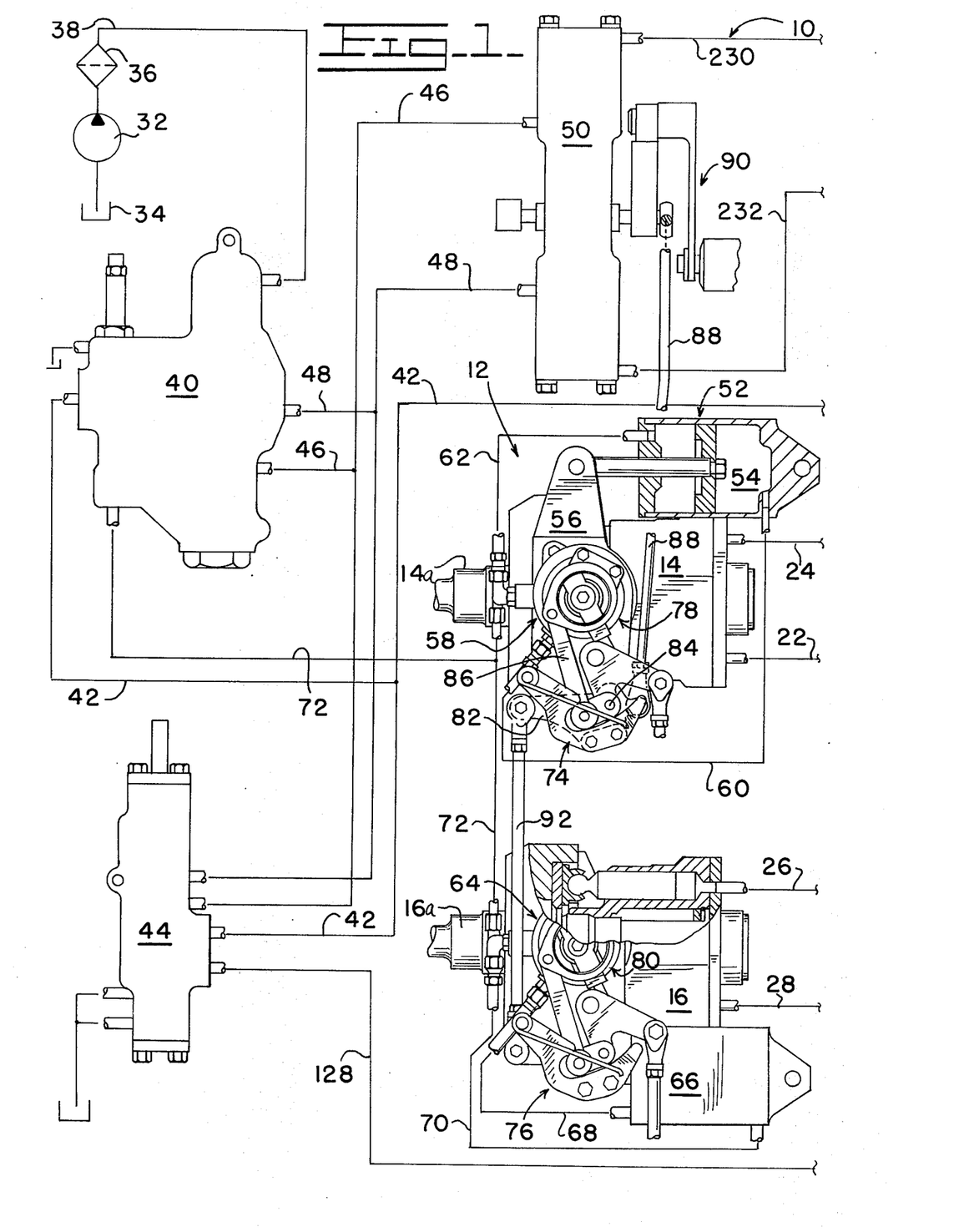
FIGS. 1 and 2 are both schematic representations, with parts illustrated in section, to provide a composite view of a control system for a pair of variable displacement pump units within a hydrostatic transmission.
Figure 2:
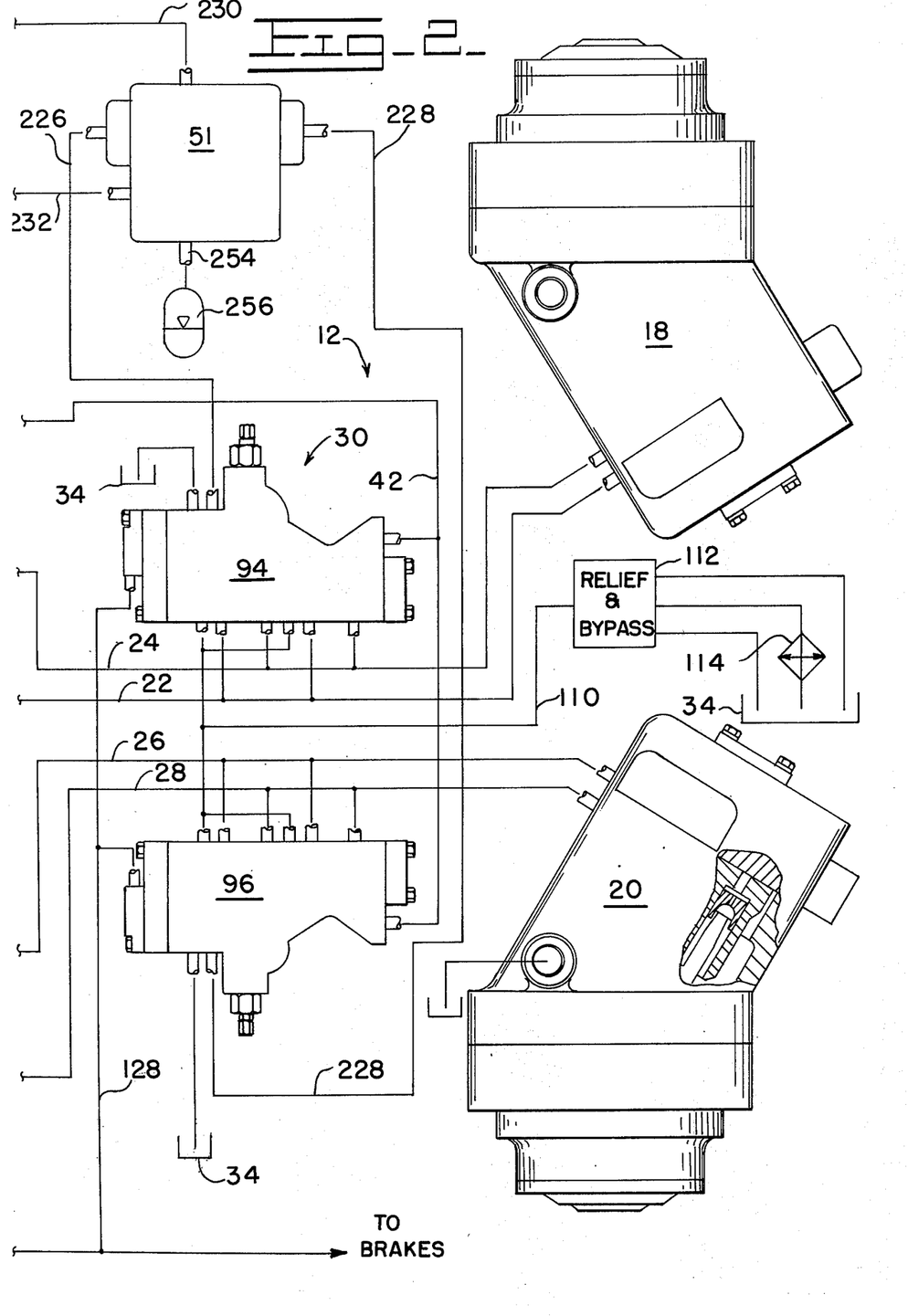

THE CONTROL CIRCUIT OF FIGS. 1 AND 2

Referring now to FIGS. 1 and 2, a hydrostatic control circuit is generally indicated at 10 for association with a hydrostatic transmission 12 including two variable displacement over-center pump units 14 and 16 and two fixed displacement motor units 18 and 20. The first pump unit 14 is in communication with the motor unit 18 by means of a closed hydrostatic loop including conduits 22 and 24. The second pump unit 16 is similarly in communication with the motor unit 20 by means of a closed hydrostatic loop including two conduits 26 and 28.

A replenishing and relief valve assembly 30 is interconnected with both pairs of hydrostatic conduits 22, 24 and 26, 28. The replenishing and relief valve assembly 30 functions in a generally conventional fashion as described in greater detail below in order to replace hydraulic fluid lost from the pump and motor combinations due to leakage and to relieve excessive hydraulic pressure developed within the pump units, the motor units and the interconnecting hydrostatic loops.

Each of the pump units 14 and 16 includes an input shaft 14a or 16a for coupling with a conventional prime mover or engine (not shown).

A fluid supply for both the hydrostatic control circuit 10 as well as the replenishing and relief valve assembly 30 is provided by a positive displacement discharging pump 32 conventionally driven by the prime mover for the transmission 12. The pump 32 draws hydraulic fluid from a reservoir or sump 34 and delivers fluid under pressure through a filter 36 into an inlet conduit 38 for a venturi manifold unit 40. The venturi manifold unit 40 supplies makeup fluid to the replenishing and relief valve assembly 30 through a branched conduit 42.

A speed control valve such as an override and vent valve 44 is also interconnected with the branched line 42 and further communicates with the venturi manifold 40 by means of a pair of branched conduits 46 and 48.

An underspeed actuator unit 50 is in communication with both the venturi manifold unit 40 and the speed override and vent valve assembly 44 by means of the branched lines 46 and 48. Construction and operational features for the underspeed actuator 50 and an associated resolver valve 51, as well as the venturi manifold 40 and speed override valve 44, are described in greater detail below.

The pump unit 14 includes a double-acting fluid actuator 52 having an extendable rod 54 coupled with a swash plate 56 for controlling fluid output from the pump 14 through the conduits 22, 24.

The pump unit 14 includes a rotary servo valve 58 which is connected to the head end and rod end respectively of the actuator 52 by means of conduits 60 and 62. Similarly, a servo valve 64 for the pump 16 is connected to the rod end and head end of another actuator 66 by conduits 68 and 70. Both rotary valves 58 and 64 are of a conventional type having a valve spool (not shown) which is rotatable therein for controlling fluid flow to the actuators 52 and 66. The spools may be rotated in either clockwise or counterclockwise fashion in order to extend or retract the respective actuators 52 and 66. This results in either clockwise or counterclockwise rotation of the swash plates to establish the direction of rotation of the respective motors 18 and 20. Actuating fluid for the servo valves 58 and 64 is supplied through a branched conduit 72 which is also in communication with the venturi manifold 40.

Each of the pumps 14 and 16 includes a control linkage arrangement 74 or 76 for positioning the valve spool of the respective servo valves 58 and 64 through separate null and gain adjuster mechanisms generally indicated at 78 and 80, respectively. Construction and operation of a control linkage of the type indicated at 74 or 76 is described in greater detail within a copending U.S. patent application entitled: CONTROL LINKAGE FOR HYDROSTATIC TRANSMISSIONS, filed on Dec. 9, 1974 as Ser. No. 530,926. Similarly, a null and gain adjuster mechanism of the type indicated at 78 or 80 is also more completely described within a copending patent application entitled: NULL AND GAIN ADJUSTMENT MECHANISM FOR HYDROSTATIC PUMPS AND MOTORS, filed on Dec. 9, 1974, as Ser. No. 530,924. Both of these inventions are assigned to the Assignee of the present invention.

These elements are summarized below sufficiently to explain the present invention. Generally, each of the pumps 14 and 16 includes a control lever 82 which may be rotated in clockwise fashion (as seen in FIG. 1) about a pivot point 84 which causes a link 86 to rotate the respective null and gain adjuster mechanisms 78 and 80 in a clockwise direction along with the valve spool for each rotary servo valve 58 and 64. Counterclockwise rotation of the levers 82 similarly results in counterclockwise rotation of the valve spools. The lever 82 for the pump 14 is manually controlled by a link 88 which is pivotably connected at one end to the lever 82, the other end of the link 88 being pivotably connected to a manually operable lever arrangement 90 which is associated with the underspeed actuator 50. An additional link 92 is interconnected between the levers 82 for the pumps 14 and 16 so that the valve spools of both rotary servo valves 58 and 64 are operated in unison. The control linkage arrangement described immediately above is resiliently urged toward a neutral position shown in FIG. 1, for example, by means of a conventional centering spring mechanism (not shown).

THE REPLENISHING AND RELIEF VALVE ASSEMBLY

Although operation of the replenishing and relief valve assembly 30 is not an essential portion of the present invention, its construction and operation is briefly described below in order to permit a better understanding of the invention. The replenishing and relief valve assembly 30 generally corresponds to the disclosure of U.S. Pat. No. 3,528,243, having particular reference to FIG. 8 of that patent. The replenishing and relief assembly includes a pair of valves indicated respectively at 94 and 96 in FIG. 2. The valve 96 is similar in construction and operation to valve 94 which is also illustrated in greater detail in FIG. 5. However, the valve 96 is in communication with the conduits 26 and 28 for the pump 16 and motor 20.

Figure 5:
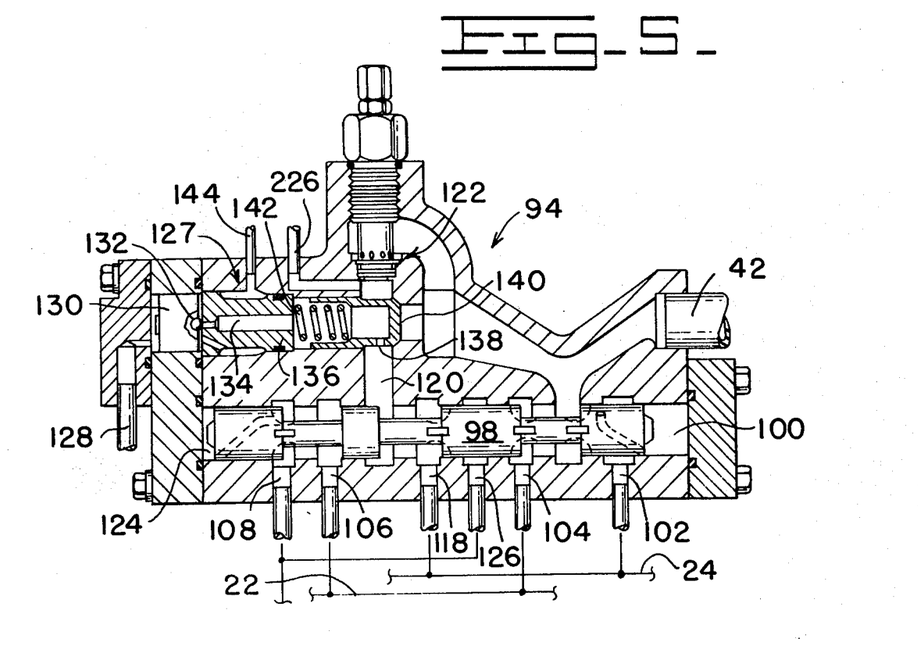
FIG. 5 is an enlarged, sectioned view of one of a pair of replenishing and relief values employed within the hydrostatic transmission control system of FIGS. 1 and 2.

Referring also to FIG. 5, the replenishing and relief valve 94 includes a valve spool 98 which is shifted in response to the relatively higher fluid pressure developed in either of the conduits 22 and 24. For example, when higher fluid pressure exists within the conduit 24, that fluid pressure enters a chamber 100 through an inlet port 102 in order to shift the valve spool 98 into the position illustrated in FIG. 5. With the spool 98 in that position, replenishing fluid from the supply line 42 is communicated to the conduit 22 across the spool 98 and through an outlet port 104. Thus, a positive pressure is established within the lower pressure conduit 22 in order to prevent pump cavitation while also adding cooled fluid to the closed hydrostatic loop between the pump and motor.

Excess fluid is removed from the conduit 22 through a port 106. With the spool 98 in the position illustrated in FIG. 5, the port 106 is in communication with another port 108 which communicates through a conduit 110 to a relief and by-pass valve 112, a heater exchanger or cooler 114 and the common sump 34, those elements being illustrated in FIG. 2.

At the same time, another port 118 within the valve communicates fluid from the conduit 24 across the spool 98 and through a passage 120 leading to a relief valve 122. The relief valve 122 opens in response to fluid pressure from the conduit 24 above a preselected level, the relief valve communicating excess fluid from the conduit 24 back to the spool 98 and
through the port 104 into the lower pressure conduit 22.

The valve 94 works in substantially the same fashion when higher fluid pressure is developed within the conduit 22. Higher fluid pressure within the conduit 22 enters a chamber 124 at the left end of the valve spool 98 causing it to be shifted fully to the right. With the spool 98 in this position, fluid from the low pressure conduit 24 is circulated to the relief and by-pass valve 112 and heat exchanger 114 through a port 126 and the same branched conduit 110. Also, higher fluid pressure from the conduit 22 is placed in communication with the passage 120 so that excess pressure may be returned to the other conduit across the relief valve 122.

Operation of a poppet valve assembly 127 is dependent upon pressurized fluid received through a conduit 128 from the speed override valve 44. Fluid pressure from the conduit 128 tends to shift a piston 130 rightwardly toward the position illustrated in FIG. 5 so that a ball 132 closes or blocks a passage 134 formed by a tubular insert 136. Thus, fluid pressure from the passage 120 enters an orifice 138 and builds up behind a poppet 140 in order to cooperate with a spring 142 in order to urge the poppet 140 toward a closed position against fluid pressure from the supply conduit 42.

When the fluid pressure is vented from the conduit 128 by the speed override valve 44, the piston 130 shifts leftwardly and permits the ball 132 to become unseated, thus opening communication to a drain passage 144. With fluid pressure thus relieved behind the poppet 140, it is shifted leftwardly by fluid pressure from the supply conduit 42 to permit fluid to escape from the passage 120, thus equalizing pressures in the conduits 22, 24 and preventing operation of the hydraulic motors 18 and 20.

THE VENTURI MANIFOLD

Figure 4:
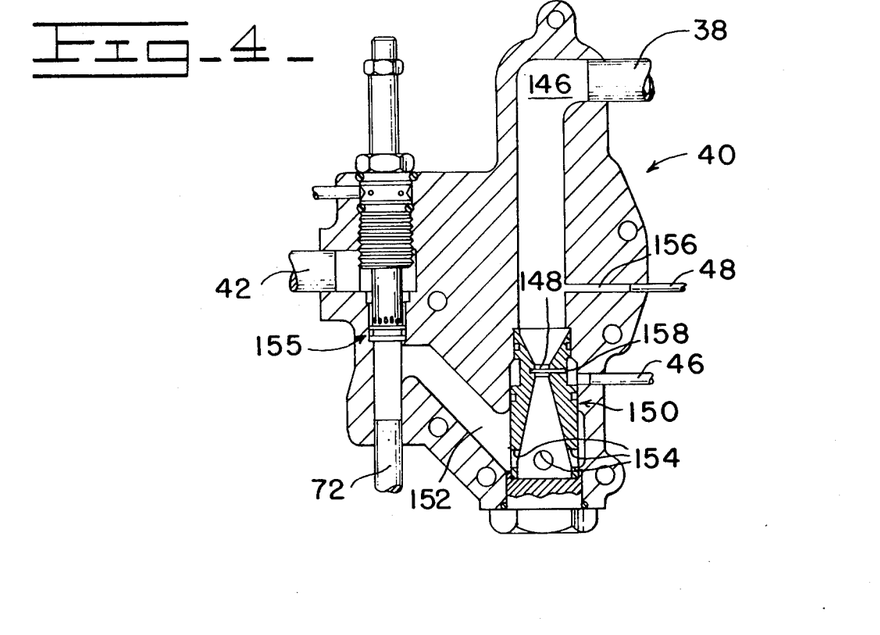
FIG. 4 is a more detailed and enlarged view, in longitudinal section, of a venturi manifold unit employed within the hydrostatic transmission control system of FIGS. 1 and 2.

The venturi manifold 40 is illustrated in greater detail within FIG. 4 and includes an inlet passage 146 for receiving fluid from the pump 32 through the conduit 38. Fluid is directed by the passage 146 through a venturi throat 148 in a venturi assembly 150 and then into a passage 152 through a plurality of radially formed ports 154. The passage 152 is in branched communication with the conduit 72 (also see FIG. 1) and a relief valve 155 which maintains a predetermined pressure within the passage 152 and conduit 72, excess fluid being returned by the relief valve to the conduit 42. Fluid pressure within the conduit 42 is maintained at a level somewhat lower than the pressure level within the conduit 72 by means of the relief and by-pass valve 112 (see FIG. 2).

A high pressure port 156 interconnects the venturi inlet passage 146 with the conduit 48 which is also in communication both with one end of the underspeed actuator 50 and with the speed override and vent valve 44 (see FIG. 1). A low pressure port 158 adjacent the venturi throat 148 is in communication with the conduit 46. As may be seen from FIG. 1, the conduit 46 is also in communication with the opposite end of the underspeed actuator 50 and the speed override and vent valve 44.

Fluid pressure within the high pressure and low pressure ports 156 and 158 is responsive to the rate of fluid flow through the venturi throat 148 and generally proportional to the operating speed of the pump 32 as well as the prime mover (not shown) by which the pump is driven. Accordingly, increasing or decreasing prime mover speed results in a corresponding change in output flow from the pump 32. The ports 156 and 158 thereby tend to adjust the pressure differential in the conduits 46 and 48 for a purpose described in greater detail below.

SPEED OVERRIDE AND VENT VALVE

Figures 3, 6, 7, 8:
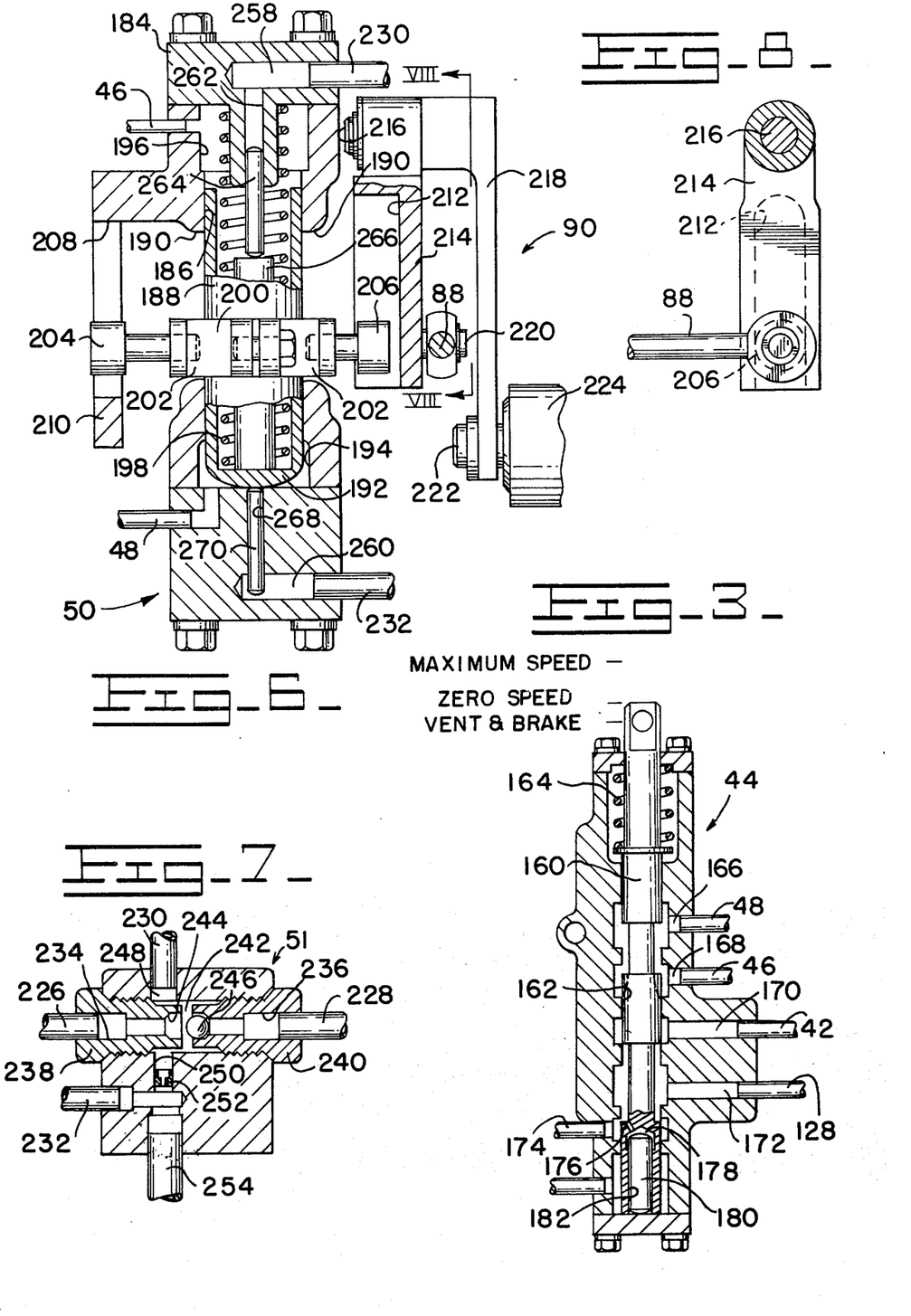
FIG. 3 is an enlarged view, in longitudinal section, of a speed control and vent valve unit employed within the hydrostatic control system of FIGS. 1 and 2.
FIG. 6 is a detailed view, with parts in section, of an underspeed actuator unit associated with a lever mechanism for adjusting pump displacement and included within the hydrostatic control system of FIGS. 1 and 2.
FIG. 7 is a detailed view, in section, of a resolver valve associated with the underspeed actuator unit of FIG. 6.
FIG. 8 is a view taken along section line VIII—VIII of FIG. 6.

The speed override and vent valve 44 illustrated in FIG. 3 includes a spool 160 arranged within a bore 162 and urged toward the position illustrated in FIG. 3 by means of a spring 164. With the spool 160 in the position illustrated, communication is established between ports 166 and 168 which are respectively connected to conduits 48 and 46. Accordingly, fluid pressure in the conduits 46 and 48 is equalized in order to override or prevent the underspeed actuator 50 from performing its normal function of varying pump displacement as described below.

Simultaneously, communication is blocked between ports 170 and 172 which are respectively connected to supply conduit 42 and conduit 128, the conduit 128 also being placed in communication with a drain port 174. With the conduit 128 thereby being vented, the loop conduits between each pump and motor combination, as indicated at 22, 24 and 26, 28 in FIGS. 1 and 2, are placed in communication with each other by means of the replenishing and relief valves 94 and 96 (also see FIG. 5). The absence of fluid pressure in the conduit 128 also results in application of a spring-applied, fluid-released parking brake (not shown).

Manual actuation of the spool 160 toward its ZERO SPEED position blocks fluid flow to the drain 174 and interconnects the supply conduit 42 with the conduit 128. Accordingly, the conduit 128 again supplies fluid under pressure to the replenishing and relief valves in order to release the parking brakes and again permit a pressure differential to be developed within each set of conduits 22, 24 and 26, 28.

Simultaneously, increasing pressure in the conduit 128 is communicated through an internal passage 176 in the spool 160 to a chamber 178. The chamber 178 is formed by a reaction slug 180 slidably disposed in a bore 182 formed by the lower end of the spool 160. Pressure within the chamber 178 acts against bias of the spring 164 so that the spool 160 is rapidly returned to its MAXIMUM SPEED position when manual restraint over the movement of the spool 160 is removed.

With the spool 160 in its MAXIMUM SPEED position, communication between the conduits 46 and 48 is blocked with the underspeed actuator 50 being allowed to function in its automatic mode for controlling vehicle speed in response to the fluid pressure differential existing between the conduits 46 and 48 as described below.

Manual control over transmission and vehicle speed is normally maintained by precise positioning of the lever arrangement 90 (see FIG. 6). Such manual control could also be maintained, for example, by means of a simple and conventional speed control valve (not shown). In either case, the speed override and vent valve 44 permits an operator to manually adjust the spool 160 between MAXIMUM and ZERO SPEED positions with fluid under pressure being relieved from the high pressure conduit 48 into the other conduit 46 in order to adjust the pressure differential existing in those conduits. Upon occurrence of a malfunction within the control circuit, such as the absence of fluid pressure in the supply conduit 42 when the engine is shut down, the spring 164 returns the spool 160 to its illustrated position and applies the parking brakes as well as terminating operation of the transmission 12 (see FIGS. 1 and 2) in the manner described above.

UNDERSPEED ACTUATOR AND RESOLVER VALVE

The underspeed actuator 50, generally illustrated within the hydraulic control circuit of FIG. 1 and more specifically illustrated in FIG. 6, responds to the fluid pressure differential existing in the conduits 46 and 48. That differential pressure, as indicated above, is generally proportional to operating speed of the pump 32 and the input shafts 14a and 16a for the respective hydrostatic pumps.

Referring now particularly to FIG. 6, the underspeed actuator 50 includes a valve body 184 forming a bore 186 for receiving an elongated tubular piston 188. The valve body 184 is also formed with diametrically opposed, elongated apertures 190 extending along a central portion of the bore 186. The tubular piston 188 is closed at its lower end 192 with counterbores 194 and 196 being formed at the lower and upper ends of the bore 186 respectively. The piston 188 is resiliently urged downwardly by a spring 198. The counterbores 194 and 196 arranged at opposite ends of the bore 186 are in respective fluid communication with the conduits 48 and 46.

An annular split collar 200 encompasses a central portion of the piston 188 and has projections 202 which extend into the elongated apertures 190. Two rollers 204 and 206 are mounted on the projections 222. The roller 204 is disposed within a guide slot 208 formed by a member 210 which is secured to the valve body 184. The other roller 206 is disposed within an elongated groove or slot 212 formed on one side of an element 214 of the lever arrangement 90 (also see FIGS. 1 and 8). The lever element 214 is pivotably connected by means of a pin 216 to an actuating lever 218. The link 88 described above with reference to FIG. 1 is pivotably secured to the opposite side of the lever element 214 at its lower end by means of a pin 220. The lever 218 is secured for rotation with a shaft 222 having a journalled support 224. The shaft 222 may thus be suitably secured to a conventional operator control (not shown) for controlling pump displacement.

The interconnection of the underspeed actuator 50 with the conduits 46 and 48, as described immediately above, permits it to respond to input speed for the transmission 12. However, the actuator 50 is also responsive to output pressure of the pumps 14 and 16 by means of its interconnection with the replenishing and relief valves 94 and 96 through the resolver valve 51 as described immediately below.

Referring now to FIG. 7, as well as FIG. 6 and FIGS. 1 and 2, the resolver valve 51 is in communication with the valves 94 and 96 by means of respective conduits 226 and 228. The resolver valve 51 is also in communication with the underspeed actuator 50 by means of conduits 230 and 232.

Referring particularly to FIG. 5, each of the conduits 226 and 228 is connected to the passage 120 in the respective valves 94 and 96. The passages 120 always receive the higher pressure in either pair of conduits 22, 24 or 26, 28 for the pumps 14 and 16. Thus, the conduits 226 and 228 are always filled with maximum output fluid pressure of the pumps 14 and 16.

Referring particularly to FIG. 7, the conduits 226 and 228 are connected to the resolver valve by means of a pair of axially aligned ports 234 and 236 formed respectively by inserts 238 and 240 which are threaded into the resolver valve 51 with the adjacent ends of the inserts defining an annular opening 242. Each of the ports 234 and 236 opens into a ball chamber 244 formed by the inner ends of the inserts. A ball 246 is loosely contained within the chamber. The annular opening 242 is in communication with the conduit 230 through a port 248 and with the conduit 232 through a passageway 250 including an orifice 252. A conduit 254 connects the passageway 250 with an accumulator 256 (see FIG. 2).

Referring also to FIG. 6, the conduits 230 and 232 are connected to ports 258 and 260, respectively formed at the upper and lower ends of the bore 186 in the underspeed actuator valve body 184. The port 258 opens to an axially extending bore 262 having a load piston 264 slidably disposed therein and abutting one end of an axially extending portion 266 of the piston 188. The other port 260 opens to an axially extending bore 268 also having a load piston 270 slidably disposed therein and abutting the lower end of the tubular piston 188.

MODE OF OPERATION

Forward travel of a vehicle including the transmission 12 is initiated by rotating the shaft 222 and lever 218 in counterclockwise fashion (as viewed from the right side of FIG. 6) toward a preselected maximum position while reversed travel may be initiated by similarly rotating the shaft and lever in a clockwise direction. The roller 206 provides a movable pivot point for the lever 214 (see FIG. 8). Thus, the position of the piston 188 within its bore 186 determines the amount of linear motion imparted to the link 88 in response to rotation of the shaft 222 and lever 218. As indicated above, the link 88 is operatively connected to the servo valve 58 through the control linkage described above with reference to FIG. 1. In this manner, the link 88 establishes the amount of displacement for both pumps 14 and 16 in order to determine the rate of operation of the motors 18 and 20.

With the piston 188 in the position illustrated in FIG. 6, the roller 206 and pivot point for the lever 214 are in axial alignment so that movement of the link 88 is not effected by rotation of the shaft 22 and lever 218. This position of the piston and condition of the underspeed actuator is commonly referred to as "FULL UNDERSPEED".

In contrast, when the piston 188 is shifted upwardly toward the upper end of its bore 186, the roller 206 also moves upwardly along the groove 212 in the lever 214 in order to change the effective moment arm for the lever. Accordingly, the link 88 experiences increased linear travel, reaching a maximum when the piston 188 is shifted completely upwardly within its bore 186. This position provides for relatively maximum displacement of the pumps 14 and 16 as well as maximum operating speed for the transmission and its vehicle, commonly referred to as "ZERO UNDERSPEED". Accordingly, it may be seen that vehicle speed can be controlled by adjusting the position of the piston 188 within the bore 186.

The piston 188 is positioned within its bore in response to the actual pressure differential existing between conduits 46 and 48 as well as force of the spring 198. The pressure differential across the conduits 46 and 48 is regulated either manually by manipulation of the valve spool 160 in the speed override valve (see FIG. 3) or automatically by means of the venturi manifold 40 (see FIG. 4) in response to operating speed of the proportional pump 32 at least when the valve spool 160 is in its MAXIMUM SPEED position.

When the transmission input shafts 14a and 16a are being driven at rated or optimum speed by a prime mover, fluid output of the proportional pump 32 is substantially constant. Fluid flow across the venturi throat 148 (see FIG. 4) creates a pressure differential between ports 156 and 158 which is communicated into the respective conduits 48 and 46. With the valve spool 160 (see FIG. 3) in its MAXIMUM SPEED position blocking communication between the conduits 48 and 46, the higher fluid pressure in the conduit 48 and the counterbore 194 of the underspeed actuator 50 is sufficient to overcome the spring 198, thus shifting the piston 188 upwardly toward its ZERO UNDERSPEED position.

However, as the transmission or vehicle encounters an increased load or increased resistance to movement sufficient to cause lugging of the prime mover, operating speed of the proportional pump 32 decreases with a resultant decrease of fluid flow through the venturi throat 148. Pressure is thus relatively increased in the outlet port 158 and the conduit 46. Increased pressure is also thereby developed in the upper end of the bore 186 for the underspeed actuator. This increased pressure cooperates with the spring 198 to urge the piston 188 downwardly generally in proportion to the amount of pressure increase within the conduit 46. Accordingly, the displacement of the pumps 14 and 16 is decreased, thereby reducing torque requirements for their input shafts 14a and 16a until the torque requirements of the pumps equal the torque output of the engine at its instantaneous reduced speed. Should the increased resistance remain constant for a period of time, the position of the piston 206 will remain balanced intermediate the ZERO UNDERSPEED and FULL UNDERSPEED positions.

When the increased load is relieved, the prime mover for the transmission is permitted to regain its rated operating speed with the pupmp 32 also returning to its normal operating speed. At the same time, normal fluid flow through the venturi throat 148 reestablishes the original pressure differential in the conduits 46 and 48 so that the piston 188 is again shifted upwardly toward the ZERO UNDERSPEED position.

As indicated above, manual control over the piston 188 is accomplished by manipulation of the valve spool 160 in the speed control valve 44 which adjusts or eliminates the pressure differential between the conduits 46 and 48. For example, increased fluid pressure in the conduit 46 cooperates with the spring 198 to shift the piston 188 downwardly in order to decrease operating speed for the transmission and its vehicle. As fluid pressure within the conduits 46 and 48 approaches equilibrium, the spring 198 shifts the piston 188 downwardly to its FULL UNDERSPEED condition where the output displacement of the pumps 14 and 16 is reduced with an equivalent reduction in the operating speed for the transmission.

During normal vehicular operation, fluid in the conduits 226 and 228 is communicated to the resolver valve 51 with the ball 246 preventing the transfer of fluid between the lines. High pressure fluid then passes through the annular opening 242 and conduits 230 and 232 to ports 258 and 260 where it acts on the load pistons 264 and 270. Fluid pressure in the conduits 230 and 232 is normally about equal so that the force of the load pistons on the tubular piston 188 is also about equal. Thus, the load pistons counterbalance each other and the underspeed actuator normally functions in the manner described above.

However, when the fluid pressure in either or both of the passages 120 in the replenishing and relief valves 94 and 96 suddenly increases, for example, when an increased load is suddenly imposed on one or both of the hydraulic motors 18 and 20, increased fluid pressure is transmitted through the appropriate conduit 226 or 228 to the annular opening 242 and through conduits 230 and 232 to the pistons 264 and 270. The orifice 252 in the passageway 250 of the resolver valve 51 and the accumulator 256 (see FIG. 2) causes a momentary lag in pressure buildup for fluid entering the conduit 232 in order to create unequal pressures in the conduits 230 and 232. Thus, the load piston 264 exerts a greater force on the tubular piston 188 urging it downwardly toward its FULL UNDERSPEED condition to decrease output displacement of the hydraulic pumps 14 and 16. If the increased load continues for a predetermined time, the higher pressure being generated by the pump results in a decrease in engine speed and the underspeed actuator commences to control the position of the tubular piston in the usual manner, thereby stabilizing the pump displacement, fluid pressure and engine speed. The orifice 252 and accumulator 256 are selected so that pressure in the conduits 230 and 232 are then equalized and the underspeed actuator remains substantially responsive only to engine speed.

Conversely, if the vehicle is operating under a loaded condition with the tubular piston 188 between the ZERO and FULL UNDERSPEED conditions and the load is suddenly removed, the pump output pressure in the appropriate conduit 22, 24 or 26, 28 and passages 120 in the replenishing and relief valves 94 and 96 suddenly decreases. Fluid pressure in the conduits 226 and 228 likewise decreases. Accordingly, fluid pressure in the conduit 230 decreases suddenly while fluid pressure in the conduit 232 remains at the higher pressure momentarily due to the orifice 252 and the pressurized fluid stored in accumulator 256. This creates an unbalanced condition with the piston 270 exerting an upward force on the tubular piston 188 (in anticipation of an increase in engine speed). When the decrease in pump pressure is reflected by an increase in the engine speed, the underspeed actuator again resumes control over the tubular piston in response to engine speed.

What is claimed is:

1. A control system for regulating displacement of a pump unit in a hydrostatic transmission for communicating output fluid under pressure to a motor unit, the control system having a proportional pump means driven in conjunction with the transmission input means to produce output fluid flow proportional to the operating speed of a transmission input means, and comprising control means coupled with the pump unit for selectively adjusting its displacement, a hydraulically responsive underspeed actuator operatively coupled with the control means in order to adjust the amount of actual change in pump displacement relative to movement of the control means, signal means for receiving output fluid flow from the proportional pump means and communicating a variable fluid signal to which the underspeed actuator is responsive, and means for sensing changes in output fluid pressure of the pump unit and biasing the underspeed actuator in response to such pressure changes in order to further stabilize the displacement setting of the pump unit, its output fluid pressure and operating speed of the transmission input means.

2. The control system of claim 1 wherein the signal means comprises a venturi unit for producing a variable differential pressure in a pair of conduits, the underspeed actuator including a valve body forming a bore in which a piston is movable for adjusting the effect of the control means on displacement of the pump unit, the sensing and biasing means tending to adjust the position of the piston in its bore.

3. The control system of claim 2 further comprising a speed control valve in effective communication with the underspeed actuator, the speed control valve including a manual override control element for selectively adjusting the variable fluid signal and the response of the underspeed actuator.

4. The control system of claim 1 further comprising a speed control valve in effective communication with the underspeed actuator, the speed control valve including a manual override control element for selectively adjusting the variable fluid signal and the response of the underspeed actuator.

5. A control system for regulating displacement of a pump unit in a hydrostatic transmission also including input means and output means, the pump unit communicating output fluid under pressure to a motor unit, comprising proportional signal means being operable with the transmission input means to produce an output signal proportional to the operating speed of the transmission input means, lever means coupled with the pump unit for adjusting its displacement, an underspeed actuator operatively coupled with the lever means in order to vary the amount of actual change in pump displacement relative to movement of the lever means, signal transmitting means for receiving the proportional output signal from the proportional signal means and communicating a variable signal to which the underspeed actuator is responsive, and means for sensing changes in output fluid pressure of the pump unit and biasing the underspeed actuator in response to such pressure changes in order to further stabilize displacement of the pump unit, its output fluid pressure and operating speed of the transmission input means.

6. The control system of claim 5 further comprising a speed control means including a manual override control element for selectively adjusting response of the underspeed actuator to the variable signal.

7. A control system for a transmission including input means, output means and means for adjusting torque transmitting capacity of the transmission, the means for adjusting torque transmitting capacity being subject to varying output load conditions, comprising proportional signal means being operable with the transmission input means to produce an output signal proportional to the operating speed of the transmission input means, control means coupled with the means for adjusting torque transmitting capacity, an underspeed actuator operatively coupled with the control means in order to vary the amount of actual change in torque transmitting capacity relative to movement of the control means, signal transmitting means for receiving the proportional output signal from the proportional signal means and communicating a variable signal to which the underspeed actuator is responsive, and means for sensing changing output load for the torque adjusting means and biasing the underspeed actuator in response thereto in order to further stabilize torque transmitting capacity and operating speed of the transmission input means.

8. The control system of claim 7 further comprising a speed control means including a manual override control element for selectively adjusting response of the underspeed actuator to the variable signal.

9. A combined hydrostatic transmission and control system, the hydrostatic transmission including a pump unit driven by a transmission input means and a motor unit coupled with the pump unit by a closed hydrostatic loop and coupled with a transmission output means, the pump unit including a movable control means for adjusting its displacement, the control system comprising a proportional pump means driven with the transmission input means to produce output fluid flow proportional to operating speed of the transmission input means, a venturi unit for receiving output fluid flow from the proportional pump means and developing a differential pressure in a pair of conduits, a speed control valve also being in communication with the two conduits and including a manual override control element for selectively intercommunicating the two conduits, a lever mechanism coupled with the movable control means for the pump unit, the lever mechanism being movable for selectively adjusting displacement of the pump unit, a hydraulically responsive underspeed actuator including a valve body forming a bore, a piston means being slidably disposed within the bore and providing a movable pivot point for the lever means, the two conduits being in communication with the bore on opposite ends of the piston in order to position the piston and adjust the pivot point for the lever mechanism relative to operating speed of the proportional pump and transmission input means, and separate biasing means arranged at opposite ends of the piston means and in communication with output fluid pressure of the pump unit by means of separate biasing conduits, one of the biasing conduits including a restrictive orifice and an accumulator means arranged between the restrictive orifice and the respective biasing means.

* * * * *